June 1, 1965 R. E. SUMMERER 3,187,244
IMPULSE INTEGRATOR DRIVE FOR MEASURING ROTARY MOTION
Filed Jan. 22, 1963
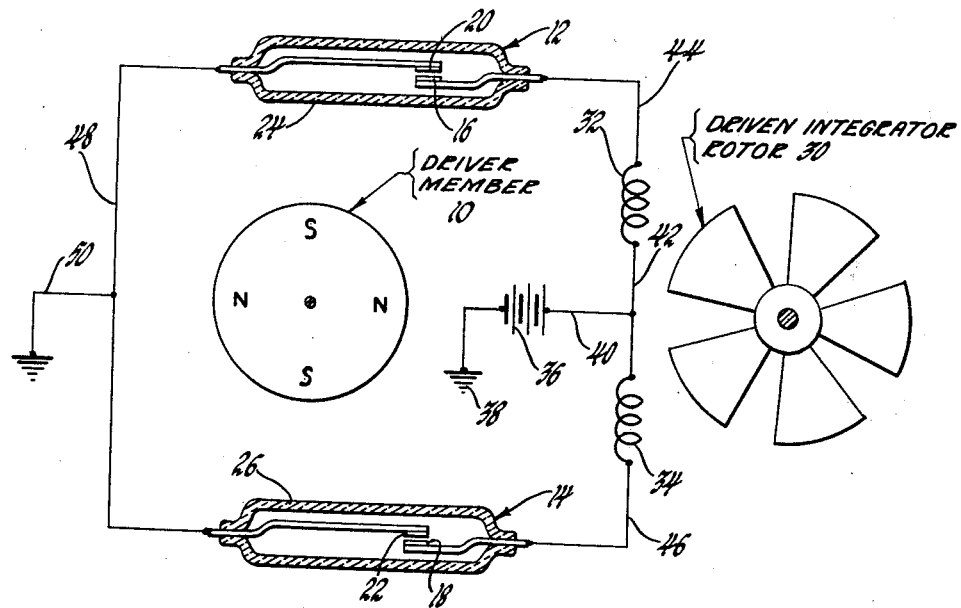
INVENTOR.
Raymond E. Summerer
BY
George E. Johnson
ATTORNEY

United States Patent Office 3,187,244
Patented June 1, 1965

3,187,244
IMPULSE INTEGRATOR DRIVE FOR MEASURING ROTARY MOTION
Raymond E. Summerer, Grand Blanc, Mich., assignor to General Motors Corporation, Detroit, Mich., a corporation of Delaware
Filed Jan. 22, 1963, Ser. No. 253,075
3 Claims. (Cl. 318—27)

This invention relates to an integrator drive and more particularly to an electrical drive such as may be suitable for operating an instrument such as an odometer.

In the past, integrators such as odometers have conventially been driven by mechanical linkages or complex arrangements susceptible to maintenance difficulties in addition to high cost of production.

An object of the present invention is to provide an improved integrator drive which is suitable for operating an instrument or device such as an odometer and which is simple, low in cost and free of maintenance difficulties.

A feature of the present invention is an integrator drive including a magnetic driving member having at least one effective pole, at least two pairs of magnetically sensitive contacts, and a stepping motor having at least one field coil connected to each pair of contacts.

The drawing shows a diagrammatic representation of a driver and driven member with electrical components by means of which revolutions may be transmitted for counting, this being one embodiment of the present invention.

A driving member in the form of a ceramic disk 10 rotatable on its axis and having multiple magnetic poles around its periphery is provided. These poles are positioned to affect reed switches 12 and 14 so that the latter alternate with each other in opening and closing. The reed switches 12 and 14 have fixed contacts 16 and 18 respectively and movable contacts 20 and 22 respectively. Reed switches of this type are commercial items with life measured in the millions of cycles of operation. They include hermetically sealed glass tubes 24 and 26 enclosing the contacts and from which terminals or arms of the contacts protrude. The contacts, not being exposed to the atmosphere, do not deteriorate.

A motor for an odometer is diagrammatically shown in the drawing to include a rotor 30 and two field coils 32 and 34. A voltage source is indicated as a battery 36 which is grounded as at 38 and which is connected by a line 40 to the junction line 42 in turn connected to one end of each of the coils 32 and 34. The other end of each of the coils is connected to a fixed contact 16 or 18 by a line 44 or 46. The movable contacts 20 and 22 are connected by a line 48 to a ground line 50.

The arrangement is such that when the member or disk 10 is rotated by a power train or other suitable component, the switch 12 will open as the switch 14 closes and vice versa. As a result the field coils 32 and 34 will alternately be energized and the rotor 30 will align itself with whichever field coil is energized. Thus, discrete steps of power application giving angular stepwise rotation for the rotor 30 will be attained dependent upon the rotation of the disk or member 10.

A drive system of this type contributes flexibility with respect to installation in any setting and particularly with relation to an automobile odometer. If desired, a drag cup, such as used in conventional speedometers, could be connected with the odometer shaft to provide speed indications particularly if the stepwise rotational movements of the odometer shaft occur with a sufficiently high frequency.

In using the term "stepping motor" herein, it is intended to refer to a motor of a type which translates electrical impulses into discrete increments of shaft rotation. Such motors are in wide and well recognized use in other fields such as, for example, in automatic machine tool control and remote positioning of items such as valves needed in industrial processes. The present invention is not concerned with the motor per se and, therefore, a complete description of the motor is not given herein.

I claim:
1. An impulse integrator drive for measuring rotary motion, said drive comprising a magnetic driving member having at least two effective poles, multiple pairs of hermetically sealed and magnetically sensitive contacts mounted near the path of movement of said poles, a stepping motor having a field coil for each of said pairs of contacts, a voltage supply source, and each pair of contacts and its associated field coil being connected in a separate series circuit with said voltage supply source.

2. An impulse integrator drive for a device such as an odometer, said drive comprising a magnetic rotative driving member having at least two poles spaced from the axis of said member, multiple pairs of magnetically sensitive contacts mounted near the path of said poles, a stepping motor having a field coil for each of said pairs of contacts, a voltage source, parallel circuits each including one of said pairs of contacts in series with its corresponding field coil, and one of said two poles being effective positively to close one of said pairs of contacts while the other of said two poles is effective positively to open another of said pairs of contacts.

3. An impulse integrator drive for an odometer, said drive comprising a rotative member having multiple poles effective at its periphery, pairs of magnetically operated contacts mounted in sequence for operation by said poles during continuous rotation of said member, a stepping motor having a rotor and a field coil for each of said pairs of contacts, each pair of contacts and its associated field coil being separately connected to a voltage supply source, said rotor being mounted remote from and free of said rotative member, and one of said poles being positioned relative to another whereby one of said pairs of contacts is closed positively while another pair of contacts is opened positively.

References Cited by the Examiner
UNITED STATES PATENTS

| | | | |
|---|---|---|---|
| 1,530,936 | 3/25 | Greenwood | 200—19 |
| 1,735,623 | 11/29 | Walker | 318—27 |
| 2,536,805 | 1/51 | Hansen | 318—49 |

JOHN F. COUCH, *Primary Examiner.*